(12) United States Patent
Hurtta et al.

(10) Patent No.: US 6,985,446 B1
(45) Date of Patent: Jan. 10, 2006

(54) INTELLIGENT NETWORK SERVICES IN PACKET-SWITCHED NETWORK

(75) Inventors: Tuija Hurtta, Espoo (FI); Reino Tammela, Espoo (FI); Jukka Wallenius, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/555,022

(22) PCT Filed: Oct. 1, 1999

(86) PCT No.: PCT/FI99/00812

§ 371 (c)(1),
(2), (4) Date: May 23, 2000

(87) PCT Pub. No.: WO00/21310

PCT Pub. Date: Apr. 13, 2000

(30) Foreign Application Priority Data

Oct. 1, 1998  (FI) ................................................ 982128

(51) Int. Cl.
*G01R 31/08* (2006.01)

(52) U.S. Cl. .................... 370/249; 455/466; 379/15.02

(58) Field of Classification Search ......... 370/351–356, 370/338, 349, 389, 400, 401, 410, 426, 467; 455/466, 403, 405, 406; 379/15.1, 15.02, 379/221.08
See application file for complete search history.

(56) References Cited

U.S. PATENT DOCUMENTS

| | | | |
|---|---|---|---|
| 5,583,918 A | * 12/1996 | Nakagawa | .................. 455/409 |
| 5,805,997 A | 9/1998 | Farris | |
| 5,905,954 A | 5/1999 | Nguyen | |
| 6,044,264 A | * 3/2000 | Huotari et al. | ............ 455/414.1 |
| 6,058,412 A | * 5/2000 | Kojima et al. | ............... 709/100 |
| 6,366,657 B1 | * 4/2002 | Yagel et al. | ............ 379/201.03 |
| 6,412,003 B1 | * 6/2002 | Melen | ......................... 709/225 |
| 6,438,122 B1 | * 8/2002 | Monrad et al. | ............. 370/349 |
| 6,510,216 B1 | * 1/2003 | Burr et al. | ............. 379/201.12 |
| 6,512,756 B1 | * 1/2003 | Mustajarvi et al. | ......... 370/341 |

FOREIGN PATENT DOCUMENTS

| | | |
|---|---|---|
| WO | WO 97/16007 | 5/1997 |
| WO | WO 97/27713 | 7/1997 |
| WO | WO 97/38511 | 10/1997 |
| WO | WO 99/51040 | 10/1999 |
| WO | WO 99/60801 | 11/1999 |

OTHER PUBLICATIONS

WO96/13949 Houtari et al., Activating IN services in a mobile system.*

* cited by examiner

*Primary Examiner*—Ajit Patel
(74) *Attorney, Agent, or Firm*—Pillsbury Winthrop Shaw Pittman LLP

(57) ABSTRACT

The invention relates to a method and a network node for providing a packet-switched network user with a service via the intelligent network. In the packet network, a session is established for routing functionality of packets originating from and terminating at the user when the user registers to the network. To implement the services according to the intelligent network principles, a control record (SR) for the session is added to the packet network node(s) which control record recognises the events which trigger the connection to the intelligent network. Alternatively, the control record can be formed when the user activates the Packet Data Protocol PDP context.

25 Claims, 4 Drawing Sheets

INTELLIGENT NETWORK SERVICES IN PACKET-SWITCHED NETWORK

This application is the national phase of international application PCT/FI99/00812 filed Oct. 1, 1999 which designated in the U.S.

BACKGROUND OF THE INVENTION

The invention relates to intelligent network services provided by a packet-switched network and, more particularly, to services provided by a wireless packet-switched network.

Mobile communications systems have been developed in order to free people from fixed telephone terminals without hindering their reachability. Along with the mobile communications systems, a variety of services provided through mobile stations have also developed. Various new forms of services are currently being planned for what are known as the third generation mobile communications systems, such as the Universal Mobile Telecommunications System (UMTS) and IMT-2000 (International Mobile Telecommunications 2000). A majority of these services is designed to use packet-switched transmission. Packet-switched services are also being developed for the current mobile communications systems, such as the Pan-European mobile communications system GSM (Global System for Mobile Communications), one of the objects of the GSM Phase 2+ standardization at ETSI (European Telecommunications Standard Institute) being the General Packet Radio Service GPRS. The GPRS allows packet data transmission between mobile data terminals and external data networks, with the GSM network functioning as an access network.

The mobile communications systems under development are expected to fulfil the need for a wide range of future services. It is difficult now even to imagine many of the services required in the future. The services will become more and more complex, and they will comprise an increasing number of independent functions. It would be reasonable to implement at least some of the services as intelligent network services. A problem is, however, that prior art intelligent network solutions are based on circuit-switched data transmission and they cannot as such be applied to a packet-switched service.

The use of the intelligent network is based on call control. A call is modelled by originating and terminating basic call state models O_BCSM and T_BSCM in a switching centre. The packet-switched network cannot utilize this model, since it does not know the concept 'call'. In the packet-switched network, data is transferred in a session, during which packet flow can be transferred to or from the terminal. Further, during the same session the terminal can transmit and/or receive packets to and from several other parties. A difference between an originating and a terminating party is not made in the session, only the packet flow, regardless of its direction, is handled. During the session, it is also possible that nothing is transferred anywhere. In intelligent network basic call state models, such cases are not described.

BRIEF DESCRIPTION OF THE INVENTION

It is thus an object of the invention to provide a method and an apparatus implementing the method to eliminate the above problems. The objects of the invention are achieved by a method for providing a packet-switched network user with a service via the intelligent network, in which method the network registration of a user is received in the packet network and a session is established for routing functionality of packets originating from and terminating at the user. The method is characterized by forming a session control record, by which event management is controlled during the session and which has a functional connection to at least one service control function of the intelligent network, and by defining at least one of the session events as an intelligent network event to the control record, the encounter of which causes the use of intelligent network control principles.

A user refers herein to an entity identified by a subscription and composed of a terminal and the actual user.

In this application, the concept 'control record' covers not only a record but also the corresponding entities.

Using intelligent network control principles means that either the event management is suspended in the packet network serving node, the information is transmitted to a service control function SCF of the intelligent network and instructions are waited from the service control function of the intelligent network or alternatively only the information on what has happened is transmitted to the service control function of the intelligent network.

The invention also relates to a method for providing a packet-switched network user with a service via the intelligent network, in which method a Packet Data Protocol (PDP) context is activated to convey data packets, and which method is characterized by forming a PDP context control record, by which the event management of the PDP context is controlled, which control record can be modelled by a state model and which has a functional connection to at least one service control function of the intelligent network, and by defining at least one of the PDP context events as an intelligent network event to the control record, which event causes the use of intelligent network control principles.

The invention further relates to a packet network node comprising a connection part to transfer packets and set up a connection to the packet network, and an application part to establish and maintain a session for routing functionality of the packets originating from and terminating at a user. The packet network serving node of the invention is characterized in that the application part is arranged to form a session control record in such a manner that at least one of the session events is defined in the control record as an intelligent network event, the encounter of which causes the use of the intelligent network control principles. The node further comprises session management means for detecting the encounter with the intelligent network event. The application part is arranged to use the intelligent network control principles in response to the encounter with the intelligent network event. The connection part is arranged to convey messages between the intelligent network and the application part.

The invention is based on the idea that a session control function is added to the packet network serving nodes, which session control function identifies those session events which trigger the connecting to the intelligent network. This provides the advantage that services can be implemented according to the intelligent network principles and also the packet-switched services can be provided with the advantages of the intelligent network: quickly and cost-efficiently implemented services and changes that are easy to make to the services. The further advantage of the invention is that both circuit-switched and packet-switched intelligent network services can be controlled from the same intelligent network platform. The invention further provides the advantage that the operator can utilize the already existing intelligent network structure.

In a preferred embodiment of the invention, a session record is formed in response to a PDP context activation.

This provides the advantage that the record is not formed until the facility to convey data packets is needed. Thus, the record is not formed only to wait for the potential conveying of the packets.

In a preferred embodiment of the invention, information on the intelligent network events is maintained in subscriber data, preferably in the home location register. This provides the advantage that the serving support node receives the information on subscriber-specific network services simply and reliably.

In a preferred embodiment of the invention, the information on the intelligent network events is located in the memory of the serving network node. This provides the advantage that these intelligent network events are always detected and the information common to everyone need not be conveyed by signalling. This saves network resources.

In preferred embodiments of the invention, the events relating to the states of various contexts, such as the network registration of a mobile station and the activation of PDP contexts, are defined as intelligent network events. These provide the advantage that the intelligent network control can be customized according to the context situation of the mobile station and that at least the establishment of contexts and the changes in the conditions are reported to the intelligent network.

In a preferred embodiment of the invention, the allocation of physical and logical connections is defined as an intelligent network event. This provides the advantage that the use of access network and core network resources can be optimised as the packet traffic is transferred between the network elements by using fixedly allocated transmission capacity for the event.

In a preferred embodiment of the invention, packets to be conveyed are monitored and a report message is transmitted to the service control function of the intelligent network only when the conditions of the given criteria are fulfilled. This provides the advantage that the amount of information to be transmitted to the intelligent network can be optimised in such a manner that the intelligent network receives the required information as often as it needs, while the network load is minimised.

In a preferred embodiment of the invention, charging criteria are received from the intelligent network and a charging record is formed on the basis of the conveyed packets and the charging criteria in the serving node. This provides the advantage that a variety of charging criteria can be used and that a charging record can be formed by means of only one additional message.

In a preferred embodiment of the invention, the amount of the spent money is constantly observed and compared with the amount of money available in the serving network node. This provides the advantage that a prepaid connection can be used.

In a preferred embodiment of the invention, a certificate is received from the intelligent network, which certificate includes a public key for authenticating a user. The use of certificates provides the advantage that the user and the network can negotiate for the authentication method to be used.

The preferred embodiments of the method and of the packet network node of the invention are disclosed in the dependent claims.

BRIEF DESCRIPTION OF THE FIGURES

The invention is now described in greater detail in connection with the preferred embodiments, with reference to the attached drawings, in which.

DETAILED DESCRIPTION OF THE INVENTION

The present invention is applicable to any packet-switched system in which the connection is based on a session and from which there is a functional connection to the service control function of an intelligent network. Examples of such systems are the third generation mobile communications systems UMTS and IMT-2000. In the following, the invention is described by using a GPRS service of the second generation GSM system, hereafter called GPRS system, as an exemplary system, without restricting the invention to such a specific system. The specifications of the mobile communications systems are developing fast. This kind of development may require additional changes in the invention. Therefore, all terms and expressions should be interpreted widely, and they are intended to describe and not to limit the invention. Essential for the invention is the function and not the fact in which network element or in which apparatus the function is performed.

Figure 1:
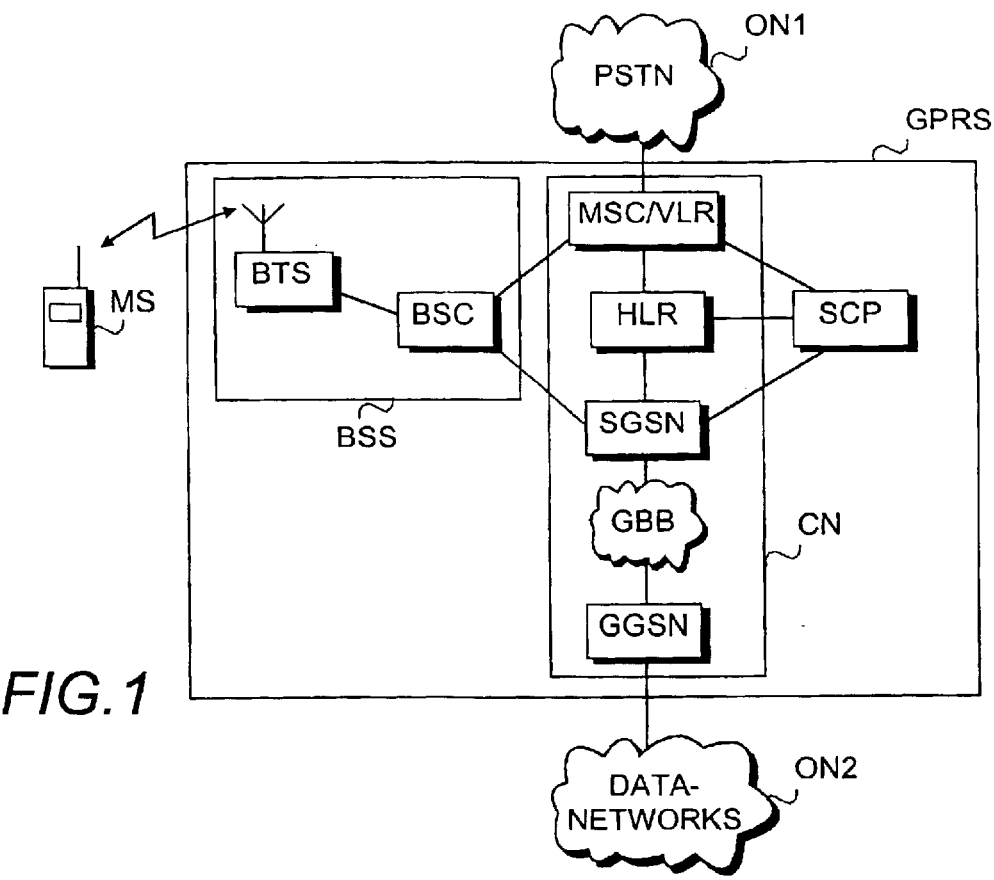
FIG. 1 shows a packet radio network.

FIG. 1 shows a generalized network architecture of the GPRS system because a more detailed structure of the network is not relevant for the invention. The GPRS system comprises the actual access network, which is a base station subsystem BSS in the example of FIG. 1, and one or more core networks CN. The access network comprises base transceiver stations BTS and base station controllers BSC controlling them. The access network BSS is mainly responsible for matters concerning the radio path, and so it provides the core network with a radio access which is needed for wireless action. The core network CN is a traditional or a future telecommunications network which is modified to utilize the access network efficiently in wireless communication. Via the core network CN, a connection to other networks ON1, ON2 can be formed. Other networks are e.g. other GPRS system networks, data networks and a public switched telephone network.

In the GPRS system, the access network services are provided by the core networks CN. In the example of FIG. 1, a GSM-based network functions as a core network, in which network the traditional GSM network provides circuit-switched transmission of information while the GPRS provides packet-switched transmission of information. The subscriber services of the traditional GSM network are at least provided by a mobile switching centre MSC and a visitor location register VLR. They are the central network elements when it comes to mobility management, control and signalling. In the example of FIG. 1, the mobile switching centre has an exchange connection to the service control point SCP of the intelligent network and to other networks ON1, such as the public switched telephone network PSTN.

FIG. 1 also shows the GPRS network elements central for the invention: the serving GPRS support node SGSN and the gateway GPRS support node GGSN. These different types of support nodes SGSN and GGSN are connected to each other by an inter-operator backbone network GBB. The inter-operator backbone network can be implemented by e.g. a local network, such as the IP network. It is to be noted that it is also possible to implement the operator GPRS network without the inter-operator backbone network, e.g. by connecting the SGSN and the GGSN functionalities into the same network node.

The serving GPRS support node SGSN is a node serving a mobile station MS. Each support node SGSN controls the packet data service in the area of one or more cells in a cellular packet radio network. For this purpose, each support node SGSN is connected to a particular local part of the access network. This connection is usually made to the base station controller BSC. The mobile station MS located in the cell communicates with the base transceiver station over the radio interface and further through the base station controller with the support node SGSN to whose service area the cell belongs. The serving support node SGSN of the invention is described in greater detail in connection with FIG. 3.

The gateway GPRS support node GGSN connects the operator GPRS service to other data networks ON2, such as the IP network (Internet, Intranet), the X.25 network or the inter-PLMN backbone network. It is a data network, through which the support nodes of different operators can communicate with each other, e.g. an SGSN with an SGSN of another operator or a GGSN with a GGSN of another operator. The GGSN includes GPRS subscriber routing information, i.e. SGSN addresses.

In the example of FIG. 1, the home location register HLR located in the core network includes GPRS subscriber data. Subscriber data includes e.g. a mobile subscriber international ISDN number MSISDN, routing information and an international mobile subscriber identity IMSI. Further, GPRS subscriber data may include one or more packet data protocol context subscription records. In subscriber data, the HLR of the invention may also maintain information on the intelligent network events relating to the packet radio service, such as on prepaid calls (so-called prepaid SIM). Intelligent network events are preferably expressed as triggering information, in which event types are listed, criteria and their conditions are defined for the event types and connection instructions to the service control function of the intelligent network are defined case-specifically. Connection instructions comprise preferably the address of the service control function of the intelligent network, the service identity and the information whether a dialogue is established between the service control function and the packet network node or whether only a report is transmitted to the service control function of the intelligent network. The home location register HLR of a roaming mobile station MS can be located in a different mobile communications network than a serving SGSN.

In the example of FIG. 1, the service control point SCP of the intelligent network is located in the mobile communications network GPRS. The service control point SCP represents the intelligent network in the example of FIG. 1. The service control point SCP is a service platform to which service functions can be loaded a nd in which these functions can be carried out. The service control point SCP can be any network node or network element including a service control function of the intelligent network or a connection to that service control function. By means of the SCF, the functions are controlled in order to produce intelligent network services. In this application, the SCF and the SCP are regarded as equal. There can even be several service control points SCP for one and the same service.

A mobile station MS refers herein generally to an entity of a mobile station subscriber and the actual terminal. A terminal can be any terminal capable of communicating in a mobile communications system or a combination of several apparatuses, e.g. a multimedia computer, to which e.g. a card phone manufactured by Nokia is connected to set up a mobile connection. In this application, a difference is not made between a subscriber and a user either.

The mobile communications system implementing the functionality of the present invention comprises not only means necessary for implementing the services according to the prior art, but also means for recognising those events during the session which relate to the intelligent network service, and means for using the intelligent network control principles. These means are preferably located in the serving support node SGSN. They can also be located in the gateway support node GGSN or in both nodes.

Figure 2:
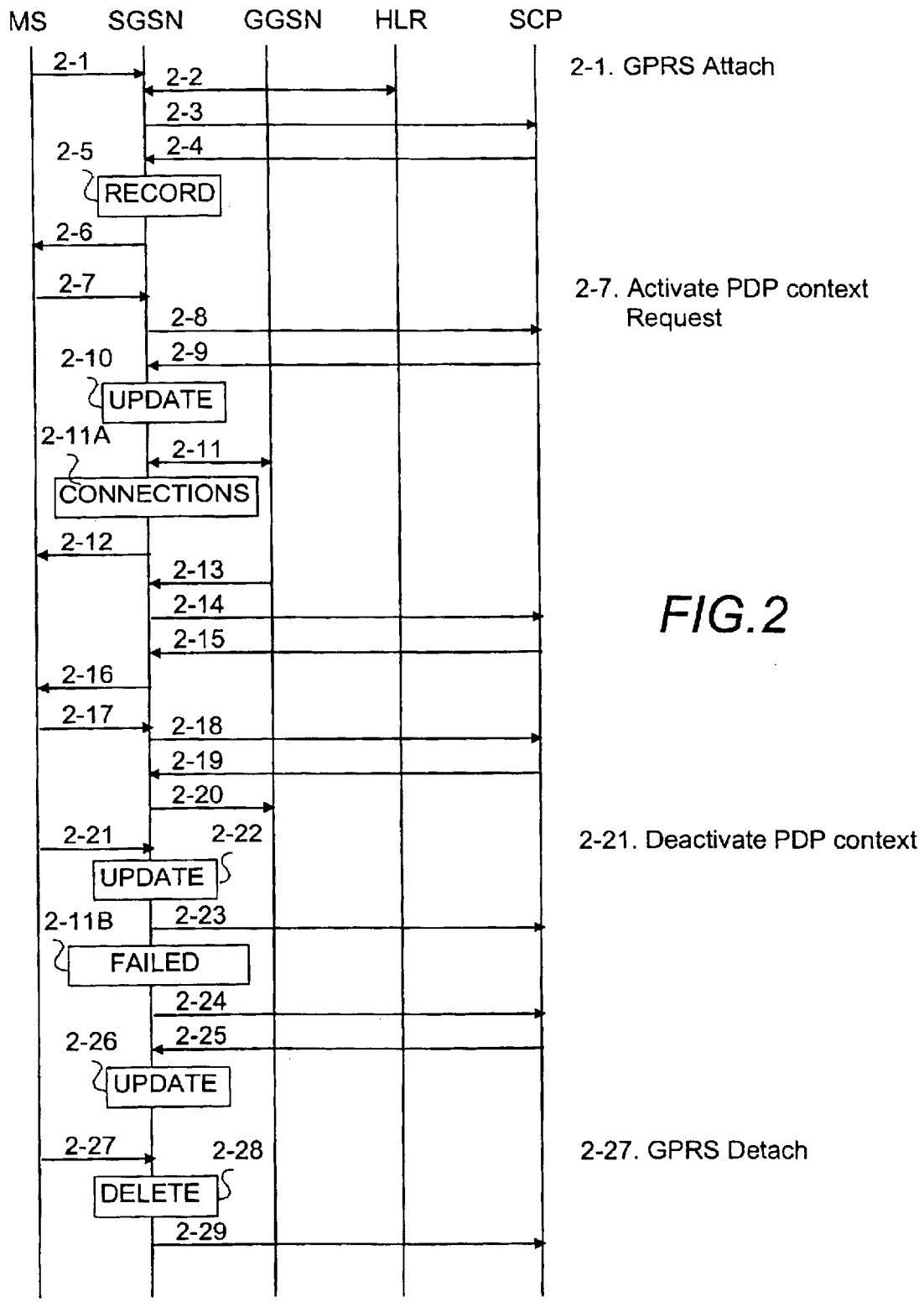
FIG. 2 illustrates the signalling according to the first embodiment of the invention.

FIG. 2 illustrates the signalling according to the first preferred embodiment of the invention. In the first preferred embodiment, a control record is created for the whole session in the serving support node SGSN. The prior art signalling is not described in its entirety and all possible signalling alternatives have not been taken into account. Exemplary events during a session are shown in FIG. 2. Thus, it is not an extensive description of the intelligent network events.

With reference to FIG. 2, the mobile station MS transmits a GPRS Attach message 2-1 to the serving support node SGSN. Upon receiving the message 2-1 the serving support node SGSN searches subscriber data from the home location register HLR in the messages 2-2. The subscriber data received from the home location register may include subscriber data of the PDP context(s) and/or information on the intelligent network events defined for the subscriber. Thereafter, the serving support node SGSN transmits the information on the subscriber performing a GPRS attach to the service control point SCP of the intelligent network in the message 2-3 and receives arming instructions concerning the intelligent network detection points from the SCP in the message 2-4. In the intelligent network terminology, messages are called operations. In this application, however, the term 'message' is used. Arming instructions of the intelligent network detection points refer to a situation, in which the serving support node receives the information on those events and the criteria and conditions potentially relating to the events, after the fulfilment of which the intelligent network control principles are used. At step 2-5, the serving support node SGSN both establishes an MM context for the mobile station to manage subscriber mobility and forms a session control record, which can be a session-specific entity. The control record includes the intelligent network events which are defined in the messages 2-2 and 2-4. Furthermore, the control record may include intelligent network events possibly defined in the serving support node. These events are common to all subscribers. Thereafter, the serving support node SGSN transmits an acceptance of the GPRS attach to the mobile station MS.

The mobile station wants to activate the PDP context and transmits an Activate PDP context Request in the message 2-7. The activation request includes e.g. the desired PDP type and PDP address. A PDP address corresponds to the used network service. A PDP address can be e.g. an IP address version 4, an IP address version 6 or an X.121 address. The serving support node SGSN examines the subscriber data of the subscriber PDP context to find the record whose parameters correspond to the information conveyed in the message 2-7. After finding the right PDP context, the serving support node SGSN transmits the information on the PDP context activation to the service control point SCP of the intelligent network in the message 2-8 and receives arming instructions of the intelligent network detection points relating to the PDP context from the SCP in the message 2-9. Thereafter, the serving support node SGSN updates the control record at step 2-10 to correspond to the instructions received in the message 2-9. The serving support node SGSN derives the right address of the gateway support node GGSN from the PDP context and updates the GGSN information according to the prior art in the messages 2-11. The messages 2-11 allow the GGSN to route messages between the SGSN and the external packet data protocol network (PDP network). The serving support node SGSN sets up the physical and logical connections relating to the PDP context at step 2-11A As the serving support node SGSN has transmitted the acceptance of the PDP context activation in the message 2-12, it is ready to route PDP packets between the gateway support node GGSN and the mobile station MS. PDP packets are also called PDP-PDU.

The SGSN receives an encapsulated packet PDP-PDU from the GGSN in the message 2-13 and decapsulates the packet. The SGSN examines the address information of the packet, recognises the mobile station to which the message is intended and checks the session control record. In this example, the address information causes the encounter of the intelligent network event defined in the control record. The packet may have been transmitted e.g. from an internet server from which the mobile station is allowed to receive information only at certain times of the day. The packet may also be such that the sender pays for its reception. The serving support node SGSN transmits the information requested by the service control point to the service control point SCP in the message 2-14 and receives the instruction (s) from the service control point in the message 2-15. An instruction can be e.g. a permission to convey the packet or a charging instruction. Thereafter, the serving support node encapsulates the packet PDP PDU and transmits it to the mobile station MS in the message 2-16.

Correspondingly, as the mobile station transmits the packet PDP PDU to the serving support node SGSN in the message 2-17, the SGSN decapsulates the packet. Thereafter, the SGSN examines the address information of the packet, recognises the mobile station and/or the PDP context to which the message relates, and checks the session control record. In this example, too, the address information of the packet causes the encounter of the intelligent network event defined in the control record. The serving support node SGSN transmits the information requested by the service control point to the service control point SCP in the message 2-18 and receives the instruction(s) from the service control point in the message 2-19. An instruction may e.g. relate to where the packet is transmitted from the gateway support node. In other words, the end address can be changed. For example, an order sent to a mail-order house can be addressed to a different place than a message asking about the delivery of the ordered articles, even though they were sent to the same mail-order house address by the mobile station. Thereafter, the serving support node encapsulates the packet PDP PDU and transmits it to the gateway support node in the message 2-20.

The mobile station starts the PDP context deactivation by transmitting the message 2-21 to the serving support node SGSN. It deletes the intelligent network events relating to the PDP context from the control record and updates the PDP context information to correspond to the inactive state at step 2-22. Thereafter, it transmits the information on the PDP context deactivation to the service control point of the intelligent network in the message 2-23 and continues the PDP context deactivation according to the prior art. In some other embodiment, the SGSN can stay and wait for the instructions from the intelligent network.

If the connection set-up (messages 2-11) fails, the serving support node SGSN detects an intelligent network event, as a result of which it does not move to step 2-11A but to step 2-11B, i.e. the failure of the connection set-up. The serving support node SGSN reports on the failure to set up a physical and a logical connection to the service control point of the intelligent network in the message 2-24. The service control point SCP of the intelligent network transmits intelligent network arming instructions relating to the PDP context to the serving support node SGSN in the message 2-25. Thereafter, the serving support node SGSN updates, if required, the session control record at step 226 to correspond to the instructions received in the message 2-25.

The mobile station MS performs a GPRS detach from the network by the message 2-27. The serving support node deletes the session control record, takes care of finishing the ongoing processes, updates or alternatively deletes the MM context and the potential PDP contexts at step 2-28. Furthermore, the serving support node SGSN reports on the log-out of the mobile station to the service control point SCP of the intelligent network in the message 2-29.

The signalling messages described above in FIG. 2 are only illustrative and may contain many separate messages to convey the same information. Besides, the messages may include also other information. Further, messages may be transmitted and the actions of the SGSN may be performed also in other order than what is described above. Same messages and steps may also be repeated in various different phases, e.g. the messages 2-7, 2-8, 2-9, 2-11 and 2-12 and the step 2-10 may always be repeated when the PDP contexts of a session are activated. Depending on the operator and the system, other network elements to which various functionalities have been distributed may also participate in data transmission and signalling. Besides, some of the signalling messages need not be transmitted, although the preceding event took place. This type of signalling messages are e.g. the messages 2-4, 2-14, 2-15, 2-18, 2-19 and 2-25. Depending on what kind of intelligent network events are defined for the session, the serving support node SGSN can transmit messages to the service control point SCP of the intelligent network at other steps as well and also receive instructions therefrom. In the first preferred embodiment it is essential that the session control record is formed in response to the GPRS attach regardless of the reason for it, and it is maintained until the mobile station logs out of the network. It is also essential in the first preferred embodiment that at least the state changes in the contexts (MM context, PDP contexts) relating to the mobile station are defined as intelligent network events in the control record. It is also preferable to define the changes in the context contents as intelligent network events. An example of a content change is a PDP context modification.

In the second preferred embodiment, the control record is formed for each PDP context, and the control record is maintained until the PDP context is deactivated. It is essential for the second embodiment that all state changes of the PDP context are defined in the control record as intelligent network events. Examples of messages causing a state change are the messages 2-7 and 2-21 in FIG. 2. Other events relating to the PDP context, such as content changes and routing, can be defined as intelligent network events as well.

Figure 3:
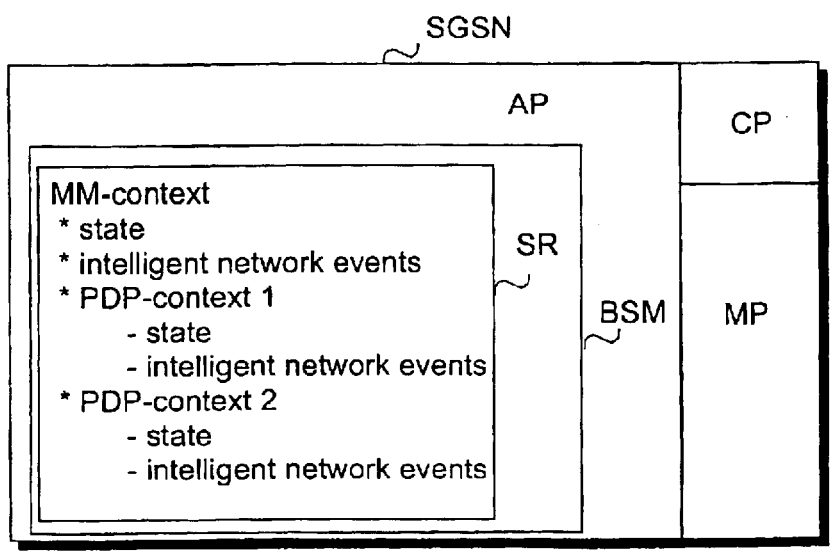
FIG. 3 shows a block diagram of a serving network node according to the first preferred embodiment of the invention.

FIG. 3 shows a block diagram of a packet network serving node SGSN according to the first preferred embodiment of the invention. The serving node comprises a connection part CP for receiving signalling and packets from other network nodes and for transmitting them to other network nodes, an application part AP controlling the connection part, and a memory part MP.

Figure 4:
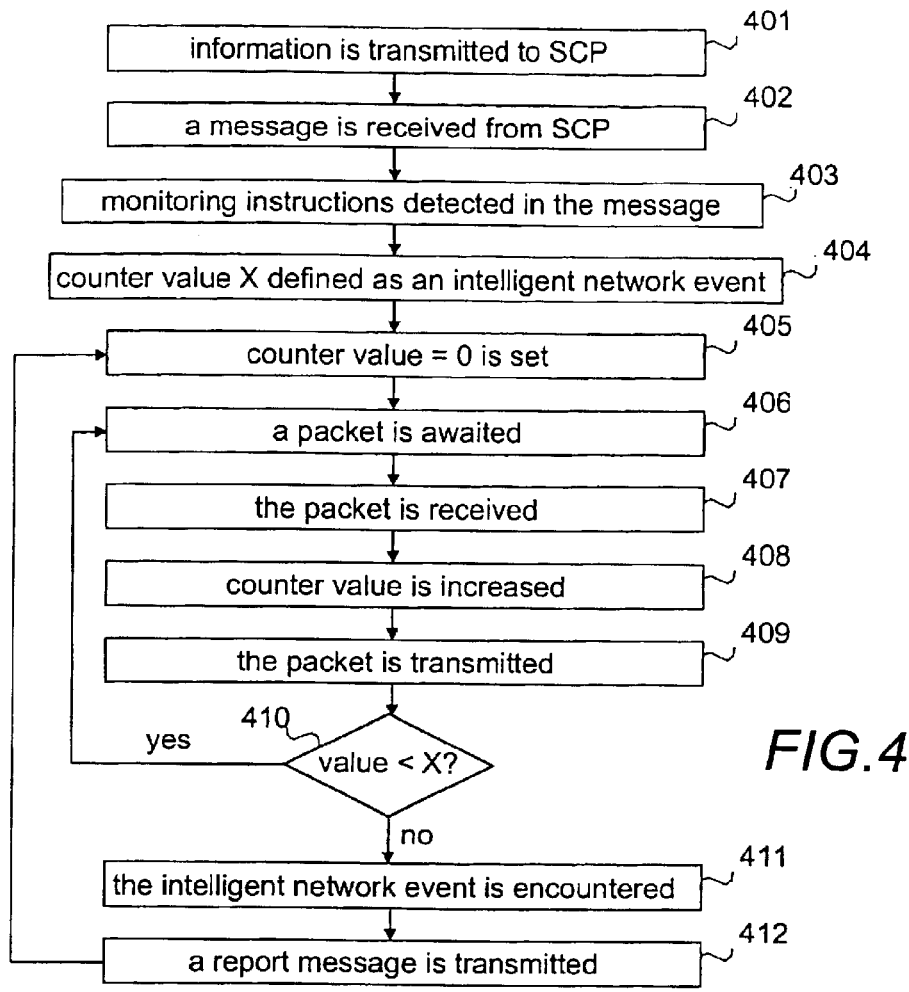
FIG. 4 shows a flow chart illustrating the monitoring of packet data transmission.
Figure 5:
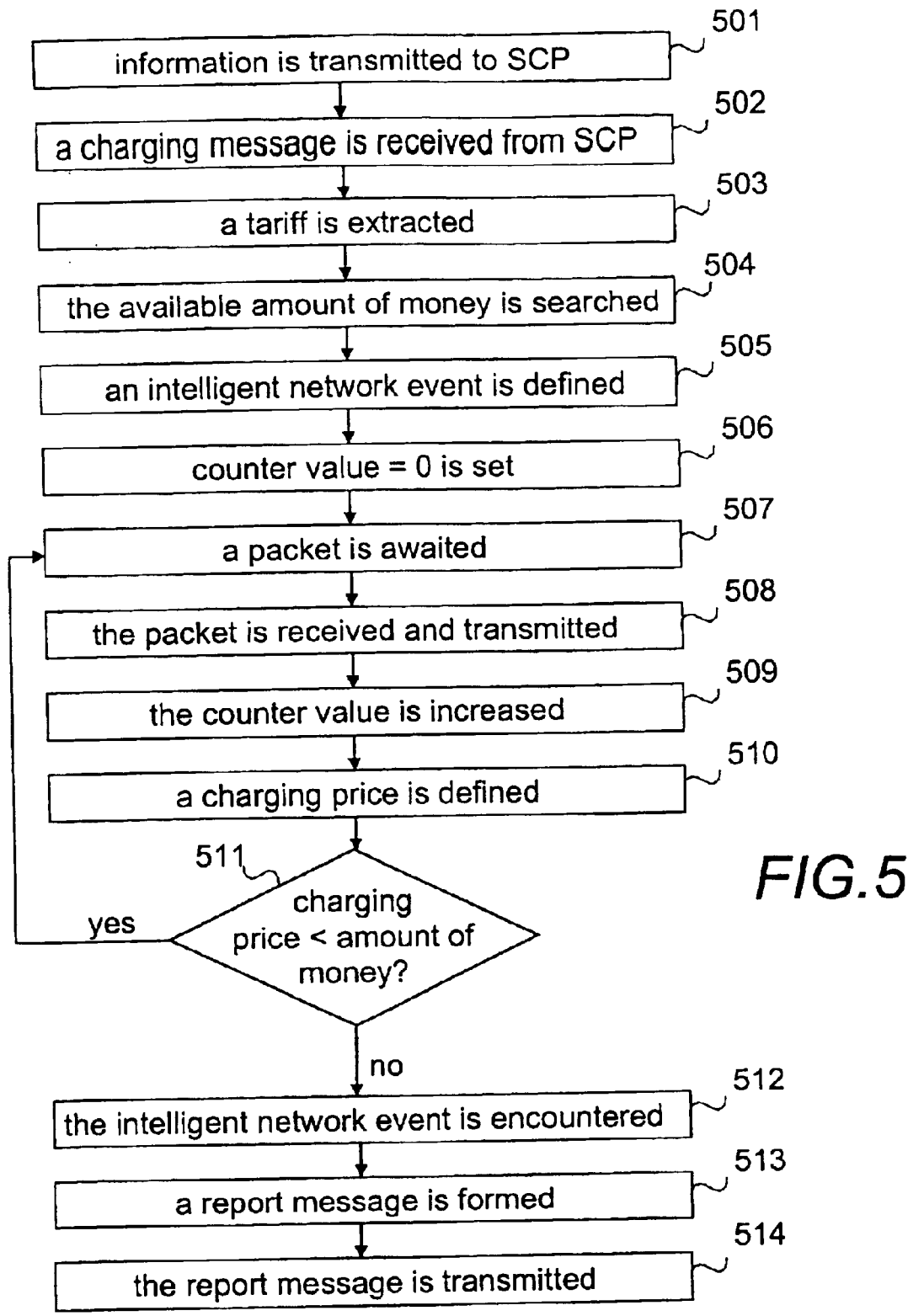
FIG. 5 shows a flow chart illustrating the control of the charging of a packet data connection.

The application part AP comprises the actual functions of the serving node. The application part AP comprises session management means, or basic session management BSM, which detects the intelligent network events. The basic session management BSM comprises a separate session record SR for each mobile station attached to the network in the serving area of the node SGSN. The application part AP performs the functions given in the messages received from the service control point SCP of the intelligent network, gives responses to the messages, requests instructions and conveys session management instructions between the session record and the SCP. On the basis of the triggering information of the intelligent network service, the application part also transmits various reports to the service control function of the intelligent network. Examples of the functions of the application part are shown in FIGS. 4 and 5.

In the first preferred embodiment, the session record SR comprises the MM context relating to subscriber mobility management in cases when the MM state of the mobile station is Standby or Ready. A mobile station has three different MM states: Idle, Standby and Ready. Each state represents a certain level of functionality and information, which is allocated to the mobile station MS and the serving GPRS support node SGSN. In Standby and Ready states, the mobile station MS is attached to the network. The Ready state is the actual data transmission state, in which the mobile station MS is capable of transmitting and receiving user data. The MS changes from the Standby state to the Ready state either when the GPRS network pages the mobile station MS or when the mobile station MS starts data transmission or signalling. The mobile station MS may stay in the Ready state (for a period of time limited by a timer) even when user data is not transferred or signalling does not take place. When the MM context is created, the intelligent network events of the session are added to the session record SR. They are received either from the SCP, the home location register HLR or from the memory of the serving node, e.g. the SGSN or GGSN. Intelligent network events are e.g. the GPRS attach of a subscriber, the PDP context activation, modification and deactivation, the allocation of logical and physical connections in addition to the session, packet routing and various error situations. Examples of error situations are a failure to establish a session, a failure to set up a connection and the detaching of a mobile station from the network in the middle of any event.

The session record SR may comprise one or more PDP contexts. In the example illustrated in FIG. 3, the session record contains two PDP contexts. They are the PDP context 1 and the PDP context 2. The serving node SGSN forms the PDP context in connection with the PDP activation procedure. Each PDP address has its own individual PDP context, which is either in the inactive state or in the active state. The active PDP context is used for routing purposes between the mobile station and the GGSN used by the subscriber inside the GPRS network. Data transmission is only possible when the PDP context is active. The state of an individual PDP context is independent of states of other PDP contexts or the state of the MM context. Correspondingly, the state of the MM context is independent of the amount and states of the PDP contexts of the subscriber. An exception is that the state of all active PDP contexts becomes inactive when the state of the MM context changes to the idle state. In the first preferred embodiment of the invention, the session record SR may comprise context-specific intelligent network events defined for the active PDP context. They are added to the session record either when activating or modifying the PDP context. The context-specific intelligent network events are usually received from the home location register HLR or from the service control point SCP of the intelligent network. FIGS. 4 and 5 show examples of context specific intelligent network events. Examples of such events are various error situations of the PDP context as well.

Transparent relay functions can be defined as intelligent network events to the session record. For example, a relay message relating to charging can be received from the service control point of the intelligent network, which message can comprise whole charging records. The session record extracts the charging record/s from the message and transfers them transparently to a charging gateway and from there further to charging systems. In this case, the charging records generated by the service control point are also transmitted to the charging gateway and to the charging systems along with the charging records formed by the packet network itself. The relay message may also comprise data elements to be combined with the charging records. A data element may be e.g. the information on charging some one else than the main subscriber. Then the data element includes the information on the basis of which the object of the charging can be identified. The session record of the serving support network extracts the data element(s) from the message and takes care of transferring said data element (s) transparently to all packet radio network nodes and gateways which collect charging information relating to the connection in question. This data element is combined with the charging records formed by the packet network itself. The data element content need not be defined in any way.

Another example of a transparent relay function is the reception of a certificate message from the service control point of the intelligent network, which message comprises e.g. a public key for authenticating the user. The session record extracts the key from the message and uses it for the mobile station authentication e.g. by comparing whether the mobile station has used the same key or a secret key corresponding the public key when coding the message it has transmitted. If the network and the mobile station want to negotiate for the authentication method to be used, the session record functions as an intermediate. In some embodiments, the session record can participate in authenticating the mobile station and e.g. negotiate for the authentication method to be used.

The memory part MP of the serving node can comprise predetermined intelligent network events which are common to all users of the serving node. State changes in different contexts can be regarded as common intelligent network events. Other common intelligent network events can be e.g. events relating to specific services and criteria that are potentially fulfilled in the event, which criteria are defined in the serving network node. An example is the order from a mail-order house mentioned in connection with FIG. 2. Intelligent network events can be expressed as triggering information, in which those event types are listed in which either a dialogue is formed between the service control function and the packet network node or only the report is transmitted to the intelligent network service control function, the additional criteria for the event types are defined and the address of the service control function of the intelligent network is defined. The memory part MP may also be located in isolation and even as distributed, as long as the application part AP has a connection to it.

Figure 6:
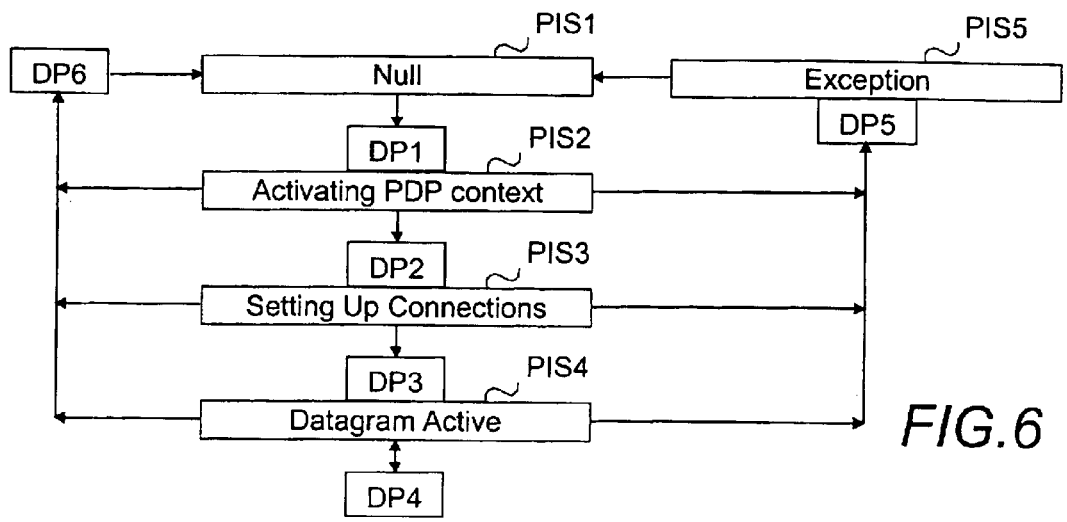
FIG. 6 shows a simplified state model of a session record.

In the second preferred embodiment, the session record SR only comprises the intelligent network events defined for the PDP context, such as state and content changes of the PDP context. Instead of a session record, a term 'context record' could be used. An example of the state model of a session record according to the second preferred embodiment of the invention is shown in FIG. 6.

The serving support node SGSN can also comprise different counters (not shown in the figure) for charging and monitoring purposes, for example, which counters are maintained by the application part according to the instructions received from e.g. the intelligent network service control point SCP. Counter maintenance instructions can also be included in the intelligent network events defined in the subscriber data and/or in the network node.

The functions of the invention, described above as locating in the serving support node, can also be located in any other packet network node, e.g. the gateway support node GGSN. It is essential that they are located in a cell to which the mobile station has a connection. Further, it is essential to ensure that the node is able to form a control record or other comparable control entity and to define the intelligent network events and to separate the intelligent network events from the normal events.

As a flow chart, FIG. 4 illustrates one example of the monitoring of packet data transmission and the transmitting of periodical messages in the serving support node SGSN by means of the intelligent network service control point. The monitoring and the transmission of the monitoring-related messages to the intelligent network service control point is either requested by the service control point of the intelligent network or is based on the triggering information of an intelligent network event. The monitoring and the transmission of monitoring messages can be defined as intelligent network events already when the session record is being formed or later during the session. Monitoring messages can be transmitted periodically or after the defined event types.

Periodical report messages are always transmitted either after a certain time slot, after a certain predetermined amount of data has been reached or after a certain time slot has passed and a certain predetermined amount of data has been reached. A predetermined amount of data can be a threshold value for the amount of data based on the size of data packet contents or the number of the conveyed data packets. Time slots or predetermined amounts of data relating to periodical report messages can also be specified by the quality of service (QoS) class and/or the direction of transmission.

Monitoring messages that should be transmitted after the defined event types are transmitted, if the defined event types take place during active PDP or MM contexts. Event types, which take place during an active context and which have to be reported, are the achievement of a certain threshold value for the transferred amount of data, its achievement within a certain time slot, the change in the quality of service (QoS) class to the transferred data packets, the change in the output or end address in data packets and the change in the mobile station location. Report messages of the events taking place during the active context are transmitted either by request of the service control function or on the basis of the triggering information of the intelligent network service. In this case, the event types to be reported are listed. Either in the triggering information or in the request of the service control function, additional criteria are preferably defined for the reporting on the event types, which criteria determine those values or sets of values relating to the PDP context by which an event type is reported. Such attributes are e.g. the prevailing quality of service (QoS) of the data to be transferred, the transferred amount of data, the output and end address and the mobile station location. The report request of the event types is either a single request concerning the first encounter with the event fulfilling the criteria or a permanent request concerning the later encounters with the event as well.

Report messages relating to data transmission, such as the amount of data, are preferably reported in each PDP context separately, whereby the amounts of data are context-specific.

The example shown in FIG. 4 starts with the PDP context activation, as a result of which the information on the PDP context activation is transmitted to the service control point SCP at step 401. Then, the message is received from the SCP at step 402. At step 403 it is detected that it is a message including monitoring instructions, in which message a periodical report is requested always when the amount of data X has been transferred. At step 404, the situation in which the value of the counter calculating the transferred amount of data reaches X is defined as the intelligent network event of this PDP context. Thereafter, the value zero is set for the counter at step 405, and it is moved to step 406 to wait for the packet to be conveyed.

The packet to be conveyed is received at step 407. The value of the counter is increased at step 408 by the amount of data included in the packet. Then the packet is forwarded at step 409 and after that it is moved to step 410, in which it is checked whether the value of the counter is less than X. If the value of the counter is less than X, the method is returning to step 406 to wait for the packet to be conveyed. If it is detected at step 410 that the value of the counter is not less than X, the intelligent network event is encountered at step 411 and the requested report message is transmitted to the service control point of the intelligent network at step 412. The report message can include the value of the counter. Thereafter, it is returned to step 405 to set the value zero for the counter.

In some other embodiment, after step 412, X can be subtracted from the value of the counter and then it is returned to step 406.

The steps described above are repeated until such an intelligent network event is encountered that ends the monitoring. This kind of an intelligent network event may be e.g. the PDP context deactivation. In the monitoring message, there may also have been a specification for the intelligent network event ending the monitoring.

FIG. 5 shows a flow chart illustrating the control of the charging of a packet data connection in the serving support node SGSN by means of the intelligent network. For the sake of clarity, it is assumed in the example that all packets to be conveyed are charged of the mobile station. The example of FIG. 5, too, starts with the PDP context activation, as a result of which the information on the PDP context activation is transmitted to the service control point SCP at step 501. Then a charging message is received from the SCP at step 502. At step 503, a tariff is extracted from the charging message. The unit price of the transferred amount of data can be fixed or the unit price may vary depending on the total amount of the transferred data, the quality of service (QoS), the address to be served from the GPRS network access point to another packet network, the direction of transmission, the output and end addresses and the combinations of these. In the tariff, a fixed price can be set for a certain amount of data or different prices for different amounts of data transferred within a certain time slot. The price is preferably expressed e.g. as metering pulses to which a certain price is determined, or as an amount of currency.

It is further assumed in the example of FIG. 5 that a mobile station uses a prepaid connection time. In other words, there is a so-called prepaid subscriber card in the mobile station. Therefore, the available amount of money is searched at step 504. Depending on the application, it can be searched from the subscriber data of the MM context, the home location register HLR or the service control point SCP of the intelligent network, for example. At step 505, the event "the available amount of money has been spent" is defined as the intelligent network event of this PDP context.

Then, the value zero is set for the counter at step 506, and it is moved to step 507 to wait for the packet to be conveyed. At step 508 the packet to be conveyed is received and forwarded. The value of the counter is increased by the amount of data included in the packet at step 509. Thereafter, the charging price corresponding to the value of the counter is defined on the basis of the tariff at step 510, and at step 511 it is checked whether the charging price is smaller than the available amount of money.

If the answer at step 511 is yes, it is returned to step 507 to wait for the packet to be conveyed.

If the answer at step 511 is no, the intelligent network event is encountered at step 512, a report message is formed at step 513 and the report message is transmitted to the service control point SCP of the intelligent network at step 514. The report message may comprise a charging record. The charging information may also be transmitted to some other network node, e.g. charging gateway. Then the session is terminated.

The definition of a charging price may only be based on the transferred amount of data, or context-specifically on the basis of the amount of data transferred by various qualities of service, the context activity time, output and end addresses or the duration of the whole session.

The steps described above in FIGS. 4 and 5 are not in absolute chronological order and part of them can be performed simultaneously or in an order different from what is described above. Between the steps, other functions, e.g. functions relating to resource management, can also be performed. Part of the functions can also be left out. It is essential that the instructions either received from the service control point of the intelligent network or included in the triggering information are followed.

Although it has been described in connection with FIGS. 4 and 5 that steps 401 and 501 are performed in connection with the PDP context activation, they can also be performed in connection with the GPRS attach procedure. Then, the monitoring in FIG. 4 and the charging in FIG. 5 can be either session-specific or PDP context-specific.

FIG. 6 illustrates a state model by which the session record of the invention can be modelled. The example in FIG. 6 shows a state model according to the second preferred embodiment. In the second preferred embodiment, each PDP context was provided with its own state model. The parts describing the model are points in session PIS, detection points DP, transitions and events. Points in session identify those functions which are performed when the session is in the corresponding state. Detection points indicate the places where the control or information can be transferred to the intelligent network. Transitions describe state transitions from one point in session to another during a session. Transitions are illustrated by arrows in FIG. 2. The arrowhead points at the direction of a transition. The events cause transitions into and out of the point in session.

With reference to step 6, the PDP context is in the idle state at the point in session PIS1 (Null). When an event activating the PDP context is encountered, it is moved to the detection point DP1. The event initiator can be a mobile station or a gateway support node GGSN. At the detection point DP1, it is reported on the PDP context activation to the service control point SCP of the intelligent network, and in the second preferred embodiment, the arming instructions of other detection points in the intelligent network are received.

When the session control has been returned to the serving support node, it is moved to the point in session PIS2 (Activating PDP Context). At this point, the PDP context activation request is analysed according to the prior art. If it deals with a handover between the serving support nodes SGSN, an active PDP context is requested from the preceding serving network node. Thereafter, it is moved to the detection point DP2. At the detection point DP2, PDP context arming instructions can be requested from the service control point SCP of the intelligent network.

Then it is moved to the point in session PIS3 (Setting up connections), at which the connections are usually set up to the base station controller BSC, i.e. a radio network controller serving the mobile station and the gateway support node GGSN according to the prior art. As a virtual connection to the RNC and a tunnel to the GGSN are formed, it is moved to the detection point DP3. At the detection point DP3 the connections can be reported to the service control point of the intelligent network, and instructions relating to the monitoring described in FIG. 4 or to the charging described in FIG. 5 can be received.

When the packet to be conveyed is received, it is moved to the point in session PIS4 (Datagram Active), at which data packets are transferred either towards the base station controller or towards the gateway support node GGSN. From this point in session, it can be moved to the detection point DP4, and it can be returned therefrom always when a predetermined intelligent network event is encountered. An example of this is the transmission of periodical reports.

If the PDP context is deactivated, it is moved from the states PIS2, PIS3 and PIS4 to the detection point DP6, at which the information on the state transition and on the charging can be transmitted to the service control point SCP of the intelligent network. Then it is moved to the point in session PIS1 to wait for the PDP context activation. The PDP context deactivation may be initiated by a mobile station or a network. The PDP context can be deactivated e.g. because the mobile station has moved to a shadow area of the network.

If it is failed at some point in session PIS2, PIS3 and PIS4, it is moved to the detection point DP5. A failure may be e.g. a situation in which the PDP context cannot be activated. At the detection point DP5 it can be reported on the failure to the service control point SCP of the intelligent network. The SCP can also transmit management instructions. From the detection point DP5 it is moved to the point in session PIS5 (Exception), at which the exception condition relating to the packet data protocol is handled. At this step, it is taken care of that no resource is uselessly remaining occupied.

From the point in session PIS5 It is moved to the point in session PIS1 to wait for the PDP context activation.

If in the example of FIG. 6, a detection point and a point in session for the GPRS attach, possibly a detection point and a point in session for the mobile station authentication, a point in session and its detection points for the point(s) in session handling failures, and a detection point for the GPRS detach are added between the points in session PIS1 and PIS2, the model could be applied when modelling the first preferred embodiment of the invention. In this case, it should be possible to perform the points PIS2, PIS3, PIS4 and PIS5 simultaneously for each PDP context. This can be modelled by adding the transitions from the points PIS2, PIS3, PIS4 and PIS5 to the detection point DP1 when some other PDP context is being activated.

With one state model, the active state of the whole PDP context or the whole session can be modelled. No separate state models are needed for the packets terminating at and originating from a mobile station.

It is obvious for a person skilled in the art that as the technology develops, the basic idea of the invention can be implemented in various ways. The invention and the embodiments thereof are thus not restricted to the examples described above, but they may vary within the scope of the claims.

What is claimed is:

1. A method for providing a packet-switched network user with a service via the intelligent network, the method comprising:

receiving the network registration of a user in the packet network;

establishing a session for routing functionality of packets originating from and terminating at the user;

forming for the session a control record by, which event management is controlled during the session and which has a functional connection to at least one service control function of an intelligent network service; and defining at least one of the session events as an intelligent network event to the control record, the encounter of which causes the use of intelligent network control principles.

2. A method as claimed in claim 1, wherein the session is modelled by a state model.

3. A method as claimed in claim 1, further comprising:

maintaining information on at least one intelligent network event in subscriber information;

searching the information from the register including subscriber information when forming the control record; and adding the intelligent network events in the subscriber information as intelligent network events of the session.

4. A method as claimed in claim 1, further comprising:

maintaining at least one intelligent network event in the node serving the user; and adding the intelligent network events maintained in the node as intelligent network events of the session.

5. A method as claimed in claim 1, wherein the GPRS attach of the user is defined as an intelligent network event of the control record.

6. A method as claimed in claim 1, wherein the packet data protocol context activation and deactivation are defined as intelligent network events of the control record.

7. A method as claimed in claim 6, wherein the packet data protocol context modification is defined as an intelligent network event of the control record.

8. A method as claimed in claim 6, wherein the packet routing is defined as an intelligent network event of the control record.

9. A method as claimed in claim 1, further comprising:

transmitting a message to the service control function of the intelligent network in response to the encounter with the intelligent network event;

receiving a message requesting a report from the intelligent network, which message includes at least one criterion and a condition relating to the criterion, after the fulfilment of which the report is transmitted;

maintaining a criterion counter;

initialising said counter; and starting the monitoring, during which the following steps are repeated:

a) increasing the counter in response to the transferred packet according to the criterion;

b) checking whether the condition given to the criterion is fulfilled, and if the condition fulfils, transmitting the report to the service control function of the intelligent network.

10. A method as claimed in claim 9, wherein said message received from the intelligent network is a message requesting a periodical report; and the method further comprises:

initialising the counter after transmitting of the report message, and repeating the monitoring steps.

11. A method as claimed in claim 1, further comprising:

transmitting the message to the service control function of the intelligent network in response to the encounter with the intelligent network event;

receiving a charging message from the intelligent network, which message includes charging criteria;

maintaining the counter;

initialising said counter;

increasing the counter in response to the transferred packet; and forming a charging record on the basis of the charging criteria and the value of the counter.

12. A method as claimed in claim 11, further comprising:

using a prepaid connection;

searching the amount of money available for the user;

defining the charging price in response to increasing the value of the counter on the basis of the charging criteria and the value of the counter;

comparing the charging price with the available amount of money; and if the charging price is smaller than the amount of money, continuing the packet transfer; or if the charging price is not smaller than the amount of money, terminating the packet transfer.

13. A method as claimed in claim 1, wherein the allocation of logical and physical connections during the session is defined as an intelligent network event of the control record.

14. A method as claimed in claim 1, further comprising:

transmitting the information on the GPRS attach of the user to the intelligent network;

receiving a certificate message from the intelligent network, which message includes a public key; and authenticating the user with the public key.

15. A method as claimed in claim 1, wherein the GPRS detach of the user is defined as an intelligent network event of the control record.

16. A method for providing a packet-switched network user with a service via the intelligent network, the method comprising the steps of:

activating a packet data protocol context to convey data packets, forming for the packet data protocol context a control record, by which the event management of the packet data protocol context is controlled, which control record can be modelled by a state model and which has a functional connection to at least one service control function of an intelligent network service, and by defining at least one of the packet data protocol context events as an intelligent network event to the control record, which event causes the use of intelligent network control principles.

17. A method as claimed in claim 16, wherein the packet data protocol context activation and deactivation are defined as intelligent network events of the control record.

18. A method as claimed in claim 16, wherein the set-up of a logical and physical connection is defined as an intelligent network event of the control record.

19. A packet network node comprising an application part to establish and maintain a session for routing functionality of the packets originating from and terminating at a user; the application part being arranged to form a control record for the session in such a manner that at least one of the session events is defined in the control record as an intelligent network event, the encounter of which causes the use of intelligent network control principles, and to use the intelligent network control principles in response to the encounter with the intelligent network event;

session management means for detecting the encounter with the intelligent network event; and a connection part to transfer packets, to set up a connection to the packet network; and to convey messages between the intelligent network and the application part.

20. A packet network node as claimed in claim 19, wherein the application part is arranged to obtain the intelligent network events defined in the subscriber information; and the session management means are arranged to detect the encounter with the intelligent network events.

21. A packet network node as claimed in claim 19, wherein the network node comprises a memory part in which at least one intelligent network event is defined; and the session management means are arranged to detect the encounter with an intelligent network event.

22. A packet network node as claimed in claim 19, wherein the application part is arranged to form a control record for the session and to use the intelligent network control principles in response to the GPRS attach of the user.

23. A packet network node as claimed in claim 19, wherein the application part is arranged to form a control record for the session and to use the intelligent network control principles in response to the packet data protocol context activation of the user.

24. A packet network node as claimed in claim 19, the packet network node being a serving support node of the packet radio network.

25. A packet network node as claimed in claim 19, the packet network node being a gateway support node of the packet radio network.

* * * * *